United States Patent
Dzięciołet al.

(10) Patent No.: US 9,810,520 B2
(45) Date of Patent: Nov. 7, 2017

(54) MEASURING RELATIVE CONCENTRICITY DEVIATIONS IN A CONFINED SPACE BETWEEN TWO CIRCUMFERENTIAL ELEMENTS

(71) Applicant: General Electric Company, Schenectady, NY (US)

(72) Inventors: Piotr Krzysztof Dzięcioł, Warsaw (PL); Paul Howard Davidson, Schenectady, NY (US); Adrian Adam Klejc, Warsaw (PL); Jean-Marie Deschamps, Belfort (FR)

(73) Assignee: GENERAL ELECTRIC COMPANY, Schenectady, NY (US)

(*) Notice: Subject to any disclaimer, the term of this patent is extended or adjusted under 35 U.S.C. 154(b) by 0 days.

(21) Appl. No.: 14/875,024

(22) Filed: Oct. 5, 2015

(65) Prior Publication Data
US 2017/0097225 A1   Apr. 6, 2017

(51) Int. Cl.
*G01B 7/14* (2006.01)
*G01B 7/312* (2006.01)

(52) U.S. Cl.
CPC ............. *G01B 7/312* (2013.01); *G01B 7/14* (2013.01)

(58) Field of Classification Search
CPC .............................. G01B 5/252; G01B 7/312
USPC .................................................. 324/228–243
See application file for complete search history.

(56) References Cited

U.S. PATENT DOCUMENTS

| | | |
|---|---|---|
| 2,419,280 A | 4/1947 | Neff |
| 3,500,181 A | 3/1970 | Jackson |
| 4,019,349 A | 4/1977 | Kouklik |
| 4,036,034 A | 7/1977 | Aisaka et al. |
| 4,087,918 A * | 5/1978 | Schmid .................. B22D 11/16 164/151.2 |
| 4,429,275 A | 1/1984 | Cedrone |
| 4,509,010 A | 4/1985 | Cedrone |
| 4,876,794 A | 10/1989 | Myers |
| 5,036,277 A | 7/1991 | Van der Walt |
| 5,183,236 A | 2/1993 | Droulon |

(Continued)

FOREIGN PATENT DOCUMENTS

| | | |
|---|---|---|
| EP | 0 200 689 | 11/1986 |
| EP | 0 572 754 | 12/1993 |

(Continued)

OTHER PUBLICATIONS

Extended European Search Report issued in connection with corresponding EP Application No. 16192097.0 dated Feb. 20, 2017.

*Primary Examiner* — Jay Patidar
(74) *Attorney, Agent, or Firm* — Nixon & Vanderhye P.C.

(57) ABSTRACT

A tool measures relative concentricity deviations in a confined space between two circumferential elements, such as a turbine rotor and a turbine diaphragm. The tool includes a housing, and a sensor coupled with the housing that measures a distance from the housing to one of the two circumferential elements. An axial spring plunger is connected to the housing, and a radial spring plunger is connected to the housing and arranged orthogonal to the axial spring plunger. The tool also includes a sliding or rolling surface on a side of the housing opposite from one of the axial spring plunger and the radial spring plunger.

11 Claims, 8 Drawing Sheets

(56) References Cited

U.S. PATENT DOCUMENTS

| | | | |
|---|---|---|---|
| 5,293,695 A * | 3/1994 | Olshefsky | G01B 5/14 33/501.04 |
| 5,392,527 A | 2/1995 | Ziskovsky et al. | |
| 5,591,196 A | 1/1997 | Marin et al. | |
| 6,182,477 B1 | 2/2001 | Shibata et al. | |
| 6,343,975 B1 | 2/2002 | Mok | |
| 6,595,285 B2 | 7/2003 | Dubois et al. | |
| 6,780,083 B2 | 8/2004 | Ising et al. | |
| 7,469,596 B1 | 12/2008 | Bernardo et al. | |
| D593,684 S | 6/2009 | Kapadya | |
| 7,665,222 B2 | 2/2010 | Dall'Aglio | |
| 7,777,682 B2 | 8/2010 | Yagi | |
| 8,149,588 B2 | 4/2012 | Sip | |
| 8,482,107 B2 | 7/2013 | Rokuhara et al. | |
| 8,716,612 B2 | 5/2014 | Schön | |
| 8,869,416 B2 | 10/2014 | Davidson et al. | |
| 2001/0028602 A1 | 10/2001 | Dubois et al. | |
| 2001/0045909 A1 | 11/2001 | Eggleston | |
| 2003/0199225 A1 | 10/2003 | Ising et al. | |
| 2004/0083024 A1 * | 4/2004 | Wang | B23P 6/002 700/195 |
| 2006/0024130 A1 | 2/2006 | Loustanau et al. | |
| 2008/0180339 A1 | 7/2008 | Yagi | |
| 2009/0013551 A1 | 1/2009 | Dall'Aglio | |
| 2011/0063813 A1 | 3/2011 | Sip | |
| 2014/0090262 A1 * | 4/2014 | Davidson | G01B 5/252 33/556 |
| 2014/0271156 A1 | 9/2014 | Suetrong et al. | |

FOREIGN PATENT DOCUMENTS

| | | |
|---|---|---|
| EP | 0 419 336 | 12/1994 |
| EP | 1 213 997 | 6/2005 |
| EP | 1 335 054 | 2/2007 |
| EP | 1 055 756 | 3/2009 |
| EP | 1 989 020 | 8/2009 |
| EP | 2 416 131 | 8/2010 |
| JP | 2014-048234 A | 3/2014 |
| WO | WO 01/21075 | 3/2001 |
| WO | WO 03/003509 | 1/2003 |
| WO | WO 2006/104098 | 10/2006 |
| WO | WO 2007/093606 | 8/2007 |
| WO | WO 2009/020397 | 2/2009 |
| WO | WO 2010/134708 | 11/2010 |
| WO | WO 2011/107869 | 9/2011 |
| WO | WO 2014/155274 | 10/2014 |

* cited by examiner

MEASURING RELATIVE CONCENTRICITY DEVIATIONS IN A CONFINED SPACE BETWEEN TWO CIRCUMFERENTIAL ELEMENTS

BACKGROUND OF THE INVENTION

The invention relates generally to a measuring tool and method and, more particularly, to a tool and method for measuring relative concentricity deviations in a confined space between two circumferential elements, such as between a turbine rotor and a turbine diaphragm.

For a turbine to operate more efficiently, during its assembly or during an overhaul, it is advantageous for the rotor to meet certain concentricity requirements relative to the stator. It is often desired to measure the concentricity of the rotor and stator with the rotor left in place. A difficulty with this approach, however, is that the small radial clearances between the rotor and stator diaphragm do not allow for the measurements to be taken manually due to the lack of access and constrained space.

BRIEF SUMMARY OF THE INVENTION

In an exemplary embodiment, a tool measures relative concentricity deviations in a confined space between two circumferential elements. The tool includes a housing, and a sensor coupled with the housing that measures a distance from the housing to one of the two circumferential elements. An axial spring plunger is connected to the housing, and a radial spring plunger is connected to the housing and arranged orthogonal to the axial spring plunger. The tool also includes a sliding or rolling surface on a side of the housing opposite from one of the axial spring plunger and the radial spring plunger.

In another exemplary embodiment, a method of measuring relative concentricity deviations in a confined space between two circumferential elements includes the steps of (a) positioning the housing between the two circumferential elements; (b) abutting the axial spring plunger against a radial projection of the inner circumferential element; (c) abutting the radial spring plunger against the inner circumferential element; (d) measuring, with the sensor, a distance from the housing to one of the two circumferential elements; and (e) sliding or rolling the housing on the sliding or rolling surface of the housing along the outer circumferential element and repeating step (d) at predefined intervals.

In still another exemplary embodiment, a tool is adapted for measuring relative concentricity deviations between a turbine rotor and a turbine diaphragm. The tool includes a housing positionable between the turbine rotor and the turbine diaphragm, and a sensor coupled with the housing that is oriented relative to the housing such that the sensor measures a distance from the housing to the turbine rotor. A plurality of axial spring plungers are connected to the housing, and a plurality of radial spring plungers are connected to the housing and orthogonal to the axial spring plungers. A sliding or rolling surface is provided on a side of the housing opposite from one of the axial spring plungers and the radial spring plungers.

DETAILED DESCRIPTION OF THE INVENTION

The invention will be described in the context of an exemplary application to a turbine. As will be appreciated by those of ordinary skill in the art, the tool and method are applicable for measuring relative concentricity deviations between any two circumferential elements, and the invention is not necessarily meant to be limited to the described turbine application.

Figure 1:
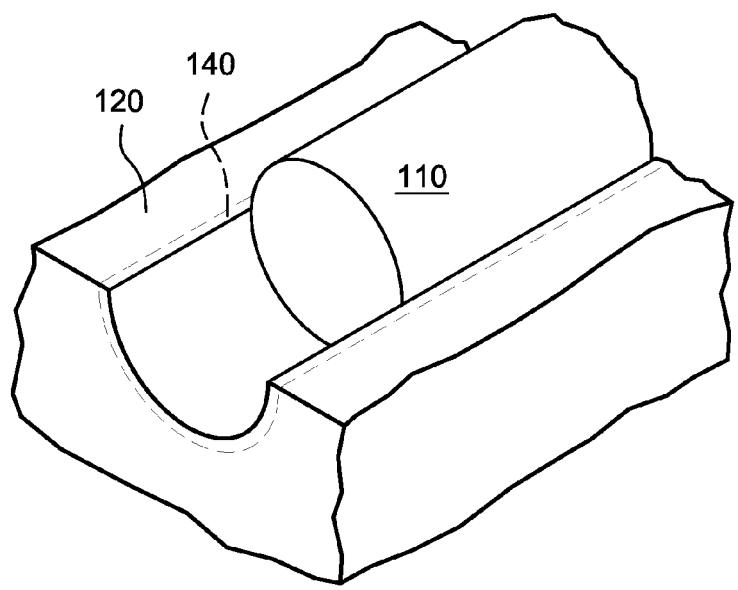
FIG. 1 is a schematic illustration of two circumferential elements between which relative concentricity deviation may be measured.
Figure 2:
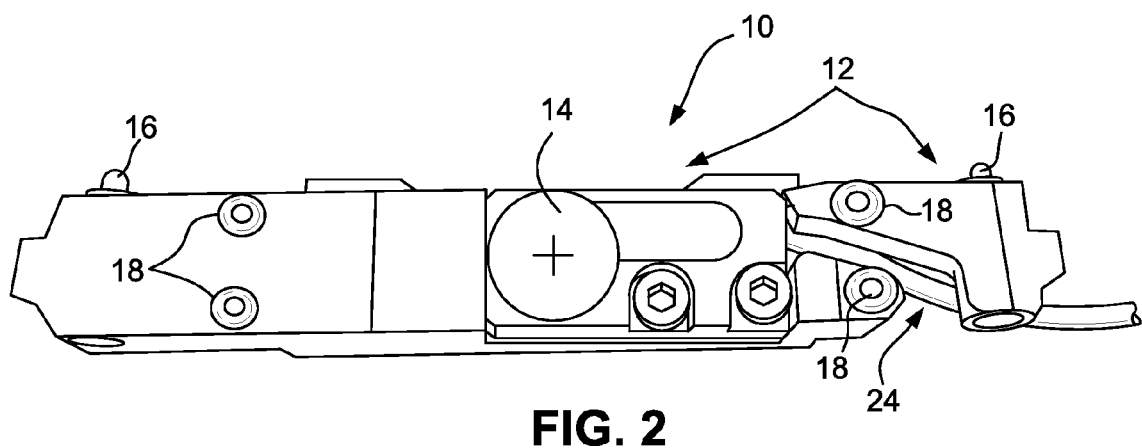
FIG. 2 is a plan view of an exemplary tool according to a first embodiment.
Figure 3:
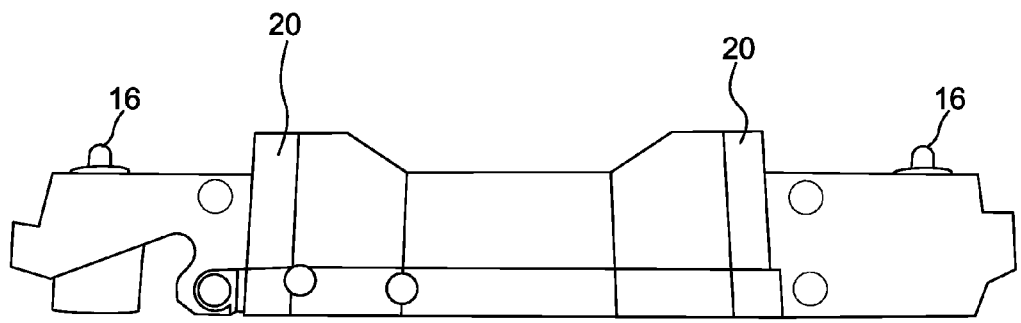
FIG. 3 is a bottom view of the tool shown in FIG. 2.

FIG. 1 is a schematic illustration of a turbine assembly with its upper stator housing removed for clarity. The turbine blades/vanes are not shown for the sake of clarity. As shown, the rotor (or the turbine shaft) 110 is positioned within the stator housing 120. For more efficient operation, it is desirable for the rotor 110 to be positioned concentrically relative to the inner circumferential surface of the stator housing 120. In some applications the stator may include a stator diaphragm 140 (shown in phantom), which nests inside the stator housing 120.

FIGS. 2-6 show an exemplary tool 10 of a first embodiment for measuring relative concentricity deviation in a confined space between two circumferential elements. The tool 10 includes a housing 12 and a sensor 14 coupled with the housing. Any sensor suitable for the described purpose may be used, and in an exemplary embodiment, the sensor 14 is a flat eddy current sensor that measures the relative distance between two elements. One or more, preferably two, axial spring plungers 16 are connected to the housing 12. Additionally, one or more, preferably four, radial spring plungers 18 are also connected to the housing. As shown, the radial spring plungers 18 are oriented orthogonally to the axial spring plungers 16. The spring plungers 16, 18 comprise posts or studs that are biased outward by a spring or the like.

A back side of housing is provided with sliding surfaces 20 to facilitate displacement of the tool 10 in the space between the circumferential elements. In an alternative embodiment, the sliding surfaces may comprise suitably arranged rollers 22 (see FIG. 6).

The housing 12 is also provided with a cutout 24 for accommodating a sensor cable.

The housing 12 may be a one-piece body that is machined from aluminum or other suitable material. The housing is also suitable for 3D printing. The spring plungers 16, 18 are connected with the housing 12 by a press fit, adhesives or using a threaded connection. The sensor 14 is connected with the housing by bolts or the like as shown. Bottom position indicators may be connected to the housing by bolts, wire rope, rivets, adhesives or any other suitable connecting mechanism to connect them securely and symmetrically.

Figure 5:
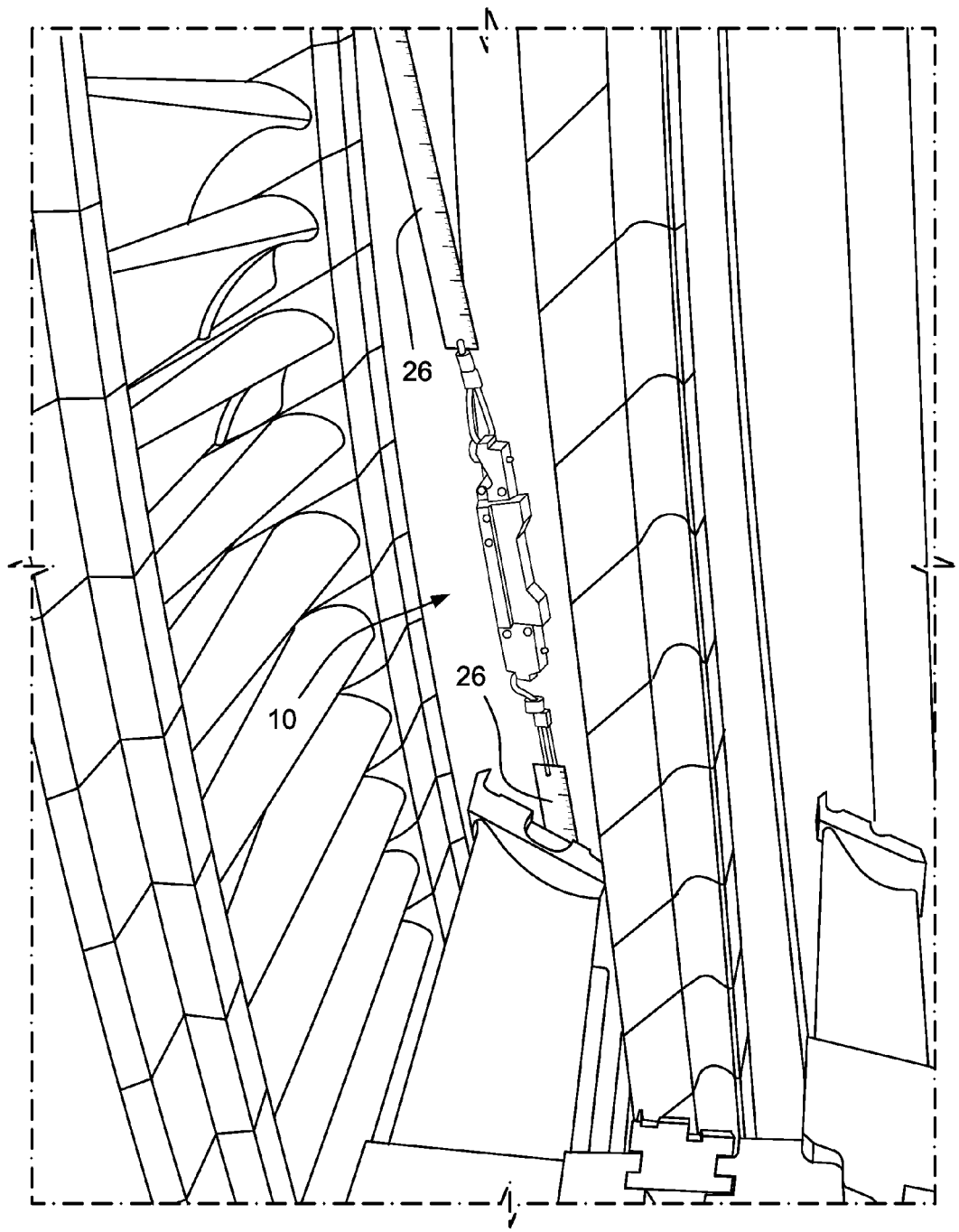
FIG. 5 shows the tool of FIG. 2 being inserted into the space between the turbine rotor and the turbine diaphragm.
Figure 6:
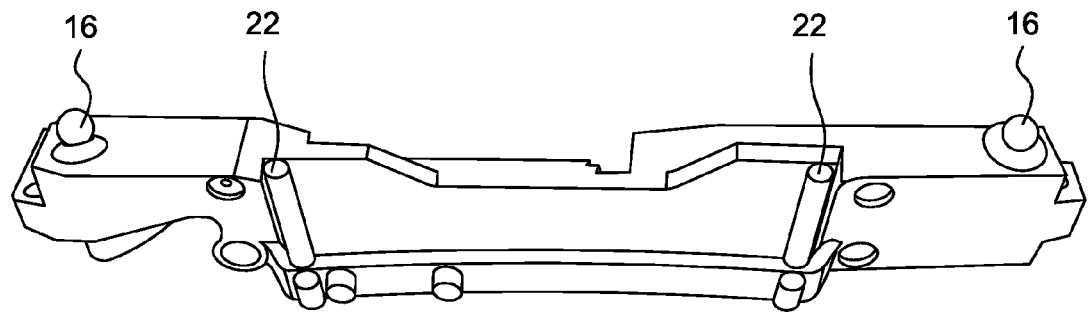
FIG. 6 shows the tool of FIG. 2 utilizing rollers to facilitate displacement of the tool in the space.
Figure 7:
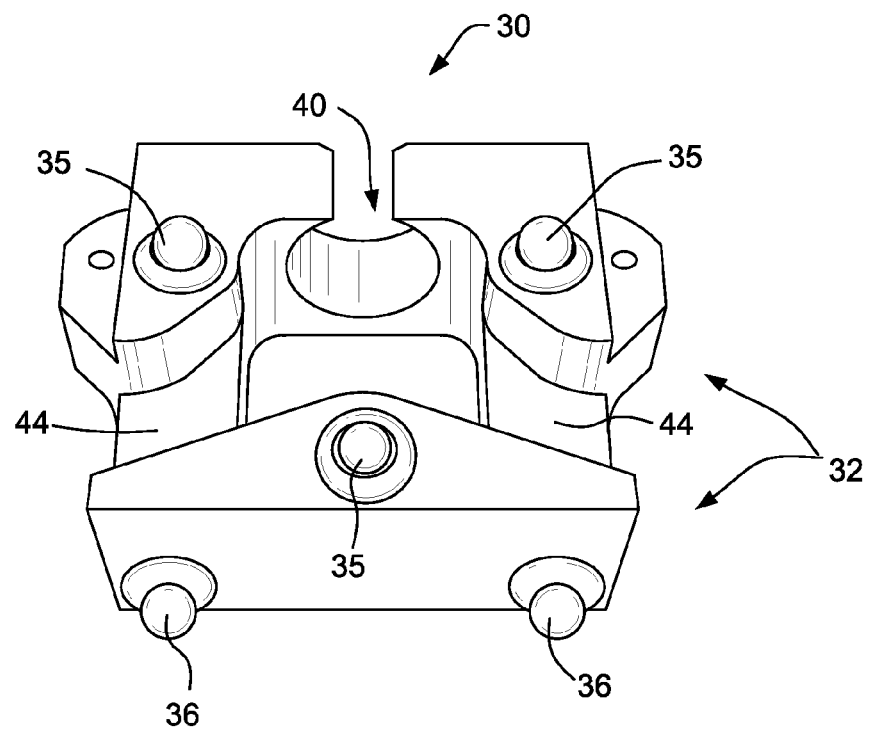
FIG. 7 illustrates a tool according to a second embodiment.

An exemplary application of the tool is for measuring the relative concentricity deviation between a turbine rotor and a turbine diaphragm. In use, it is desirable to determine when the tool is positioned at a bottom or center position of the rotor. The tool 10 is thus provided with a bottom position indicator connected to the housing. With reference to FIG. 5, in an exemplary embodiment, the bottom position indicator comprises two tape measures 26 respectively attached to opposite longitudinal ends of the housing 12. With operators on opposite sides of the rotor, when both tape measure readings are the same, the tool is in the center of the groove.

Figure 4:
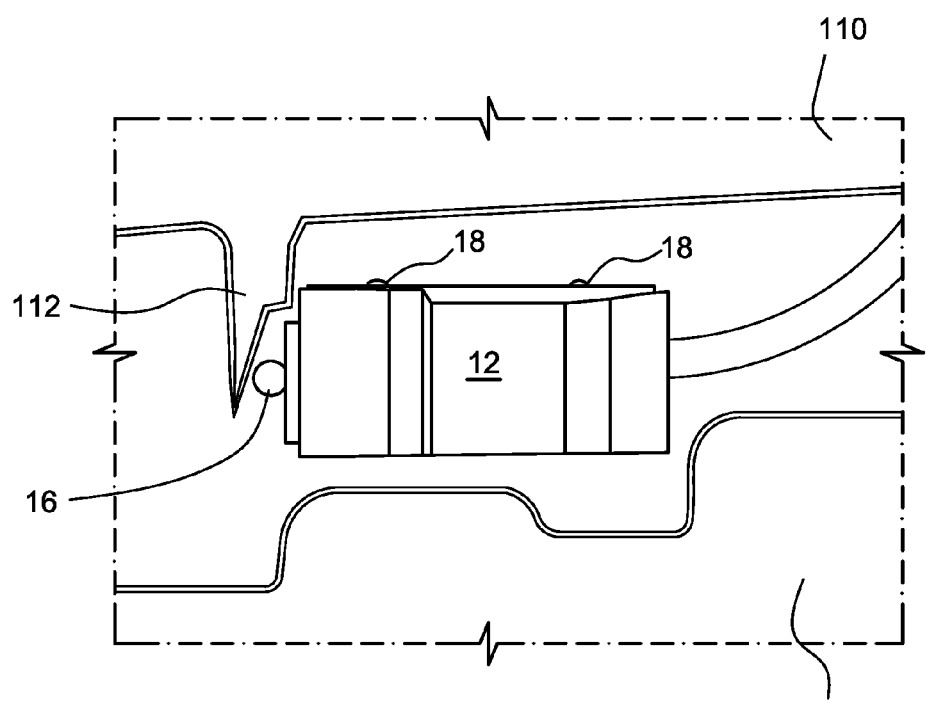
FIG. 4 shows the tool of FIG. 2 installed between a turbine rotor and a turbine diaphragm.

FIG. 4 shows the tool 10 inserted in the space between the turbine rotor 110 and the turbine diaphragm 140. As shown, the axial spring plungers 16 and the radial spring plungers 18 are positioned relative to the housing 12 for engagement with the inner circumferential element (i.e., the rotor 110 in FIG. 4). The spring plungers 16, 18 thus serve to position the tool steadily and repetitively in the space between the circumferential elements. The rotor 110 includes a radial tooth 112 or other inner ring with which the axial spring plungers 16 are engaged. Rotor teeth are used to provide proper sealing and accommodate positional deviations due to thermal changes during use. The tool 10 utilizes the rotor teeth in the exemplary application for maintaining a position of the tool 10. The sliding 20 or rolling 22 surface is positioned relative to the housing 12 for engagement with the outer circumferential element, i.e., the diaphragm 140 in FIG. 4. Once inserted, the sensor 14 measures the relative distance between the two circumferential elements, enabling the elements to be realigned if necessary to achieve required concentricity. The tool 10 may alternatively be oriented otherwise, sliding or rolling on the inner surface (rotor) 110 and measuring the distance to the outer surface (diaphragm) 140.

The tool is also composed of a shimming system that allows for sensor head adjustment. The shimming system includes thin metal shims or the like that are selectively inserted between the sensor 14 and the housing 12, thereby adjusting a position of the sensor relative to the housing. One or several shims can be inserted if needed. The shims may include openings therein that receive the same connectors that secure the sensor to the housing 12.

FIGS. 7-14 illustrate an alternative embodiment for measuring relative distances between two circumferential elements. The tool 30 includes a housing 32 and a sensor 34 coupled with the housing. One or more axial spring plungers 35 are connected to the housing, and one or more radial spring plungers 36 are connected to the housing and are orthogonal to the axial spring plungers 35. A sliding 38 or rolling 39 (see FIG. 14) surface is provided on a side of the housing 32 opposite from the axial spring plungers 35.

The housing 32 includes a sensor mount hole or opening 40 in which the sensor 34 is mounted. In an exemplary embodiment, an exterior surface of the sensor 34 is threaded, and the tool 30 may be provided with attachment members 42 that can be threaded on the sensor 34 on opposite sides of the opening 40.

The housing preferably includes two cutouts 44 for accommodating the sensor cable. By including cutouts on opposite sides of the housing 32, measurements may be taken from both sides of the circumferential elements, e.g., both sides of a turbine. That is, the tool 30 can be inserted into the groove from either side.

The housing 32 is similarly of a shape and construction that are suitable for 3-D printing.

Figure 8:
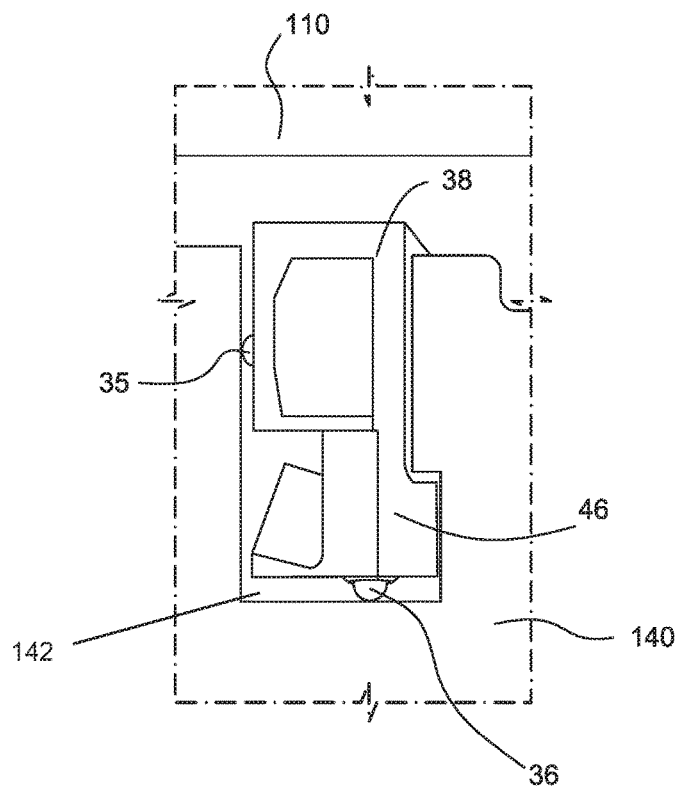
FIG. 8 shows the tool of FIG. 7 installed in a groove in a turbine diaphragm adjacent the turbine rotor.
Figure 9:
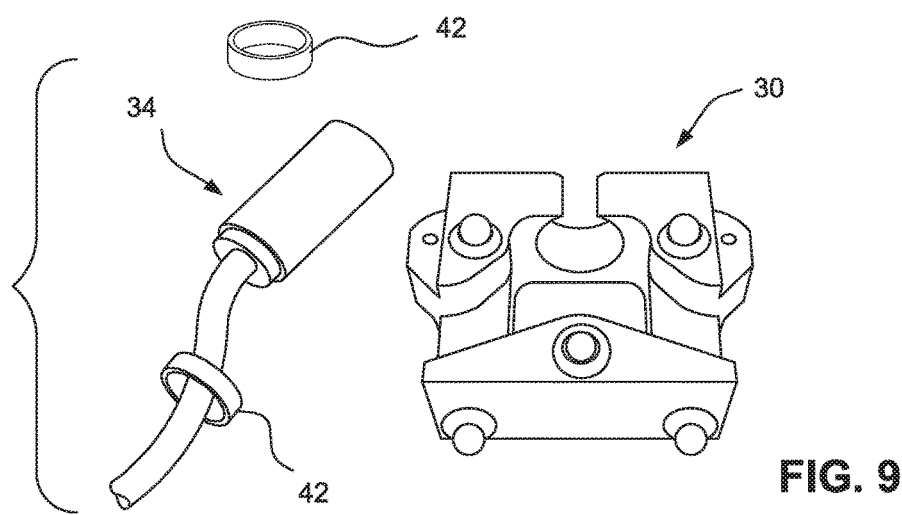
FIGS. 9-12 illustrate installation of the sensor in the tool OF FIG. 7.
Figure 10:
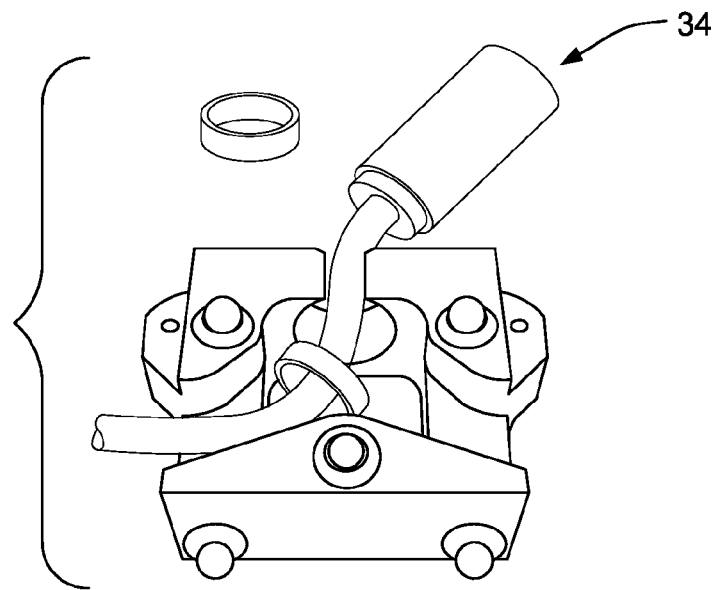
Figure 11:
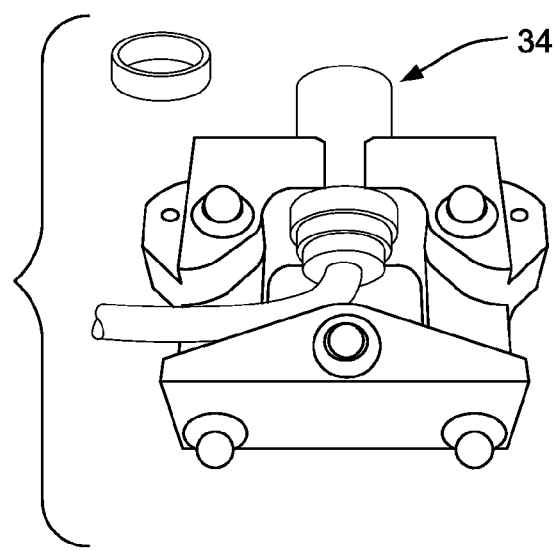
Figure 12:
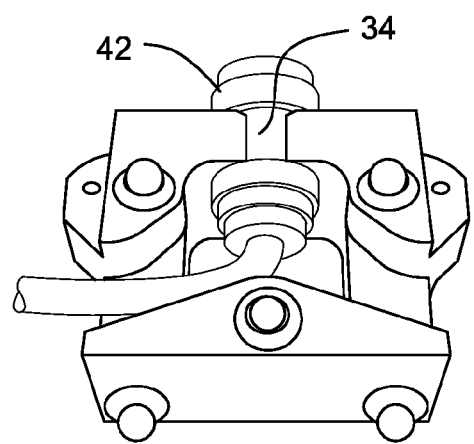
Figure 13:
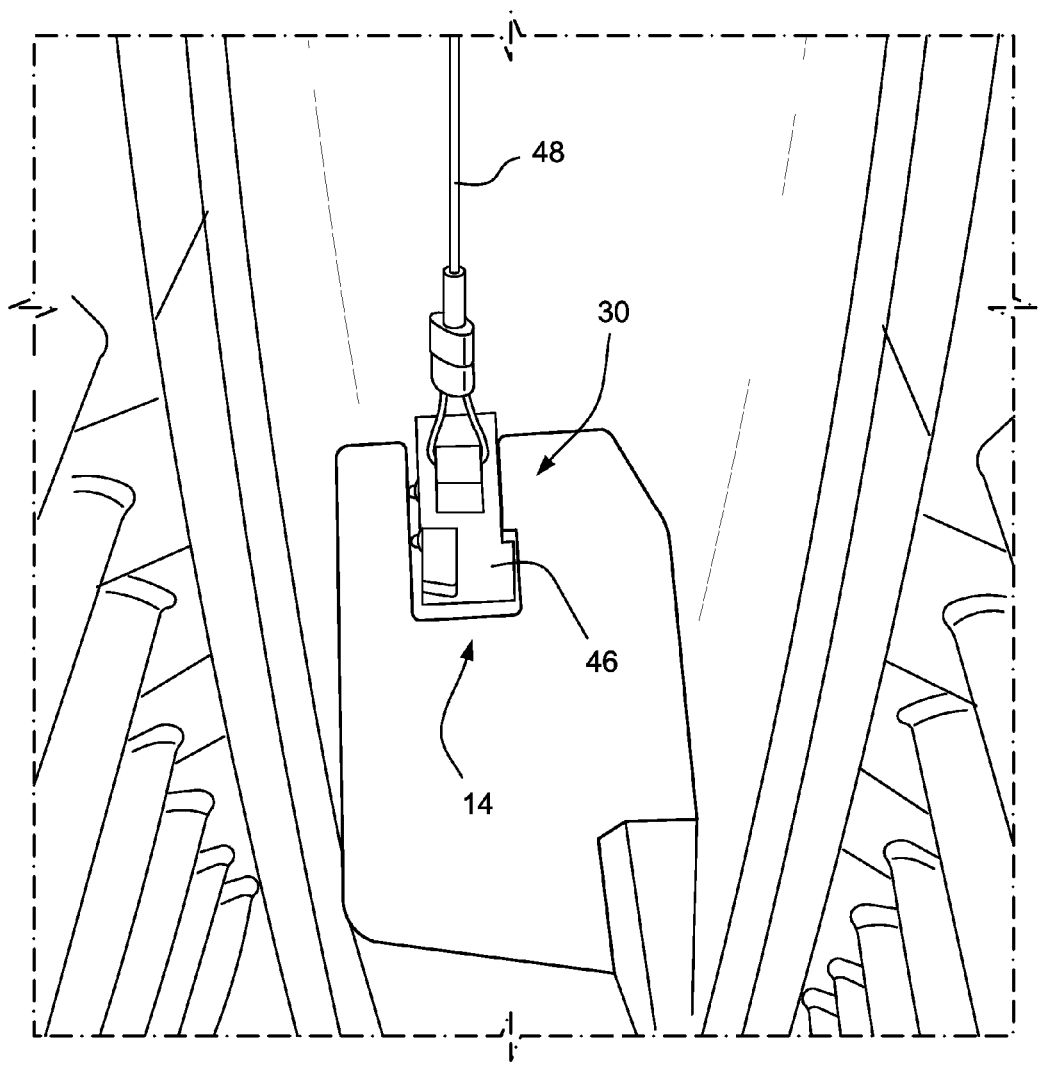
FIG. 13 shows the tool of FIG. 7 in the turbine diaphragm groove.
Figure 14:
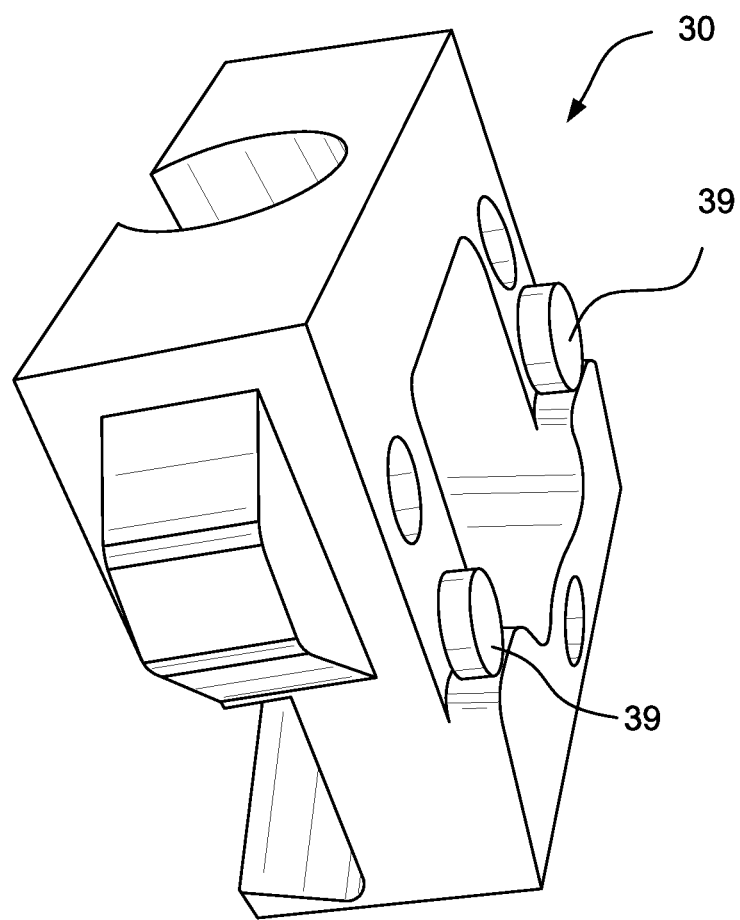
FIG. 14 shows the tool of FIG. 7 including rollers for facilitating displacement of the tool in the turbine rotor groove.

In an exemplary application, the tool 30 is adapted for measuring the relative concentricity deviations between a turbine rotor and a turbine diaphragm. With reference to FIGS. 8 and 13, the housing 32 may be sized to fit in a groove 142 in the diaphragm 140. As shown in FIGS. 8 and 13, the housing 32 may be provided with an axial step section 46 protruding axially from the housing 32 such that the housing is shaped corresponding to the groove 142 in the turbine diaphragm.

With continued reference to FIG. 8, with the tool positioned in the diaphragm groove 142, the axial spring plungers 35 act against a side surface of the groove, and the radial spring plungers 36 act against a bottom portion of the groove. The spring plungers self-position the tool 30 steadily and repetitively in the groove. Once the tool 30 is inserted, the sensor 34, such as an eddy current sensor, measures the relative distance between the two elements.

The tool 30 is preferably provided with a bottom position indicator 48. In one construction, the bottom position indicator comprises two ropes, one each attached to opposite longitudinal ends of the housing. The ropes may be provided with color-coded markings in equal increments on opposite sides of the tool. In use, the operators can access a table that coordinates a color with the bottom position of a particular stage. For example, if the operators are using the tool on turbine stage 51, the chart may indicate that color code red corresponds to the bottom position for that stage. Operators on opposite sides of the turbine can then position the ropes so that the red code marker is correspondingly positioned, thereby ensuring that the tool is at the bottom reading position.

The tool geometry according to the described embodiments including the spring plungers provides for high repetitiveness and accuracy of measurements. The sensor cable cutouts in the housings prevent cable damage, and in the second embodiment, provide the ability to take measurements from both sides of the turbine. The tool allows for realigned elements to achieve required concentricity. Alignment of the diaphragms using the tool according to preferred embodiments can be achieved in an accurate and repetitive manner avoiding the use of a crane. The tool prevents outage/installation delays, reducing diaphragm positioning corrections (critical path) to minimum due to accurate and fast readings.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A tool for measuring relative concentricity deviations in a confined space between a turbine rotor and a turbine diaphragm, the tool comprising:
   a housing;
   a sensor coupled with the housing, the sensor measuring a distance from the housing to one of the turbine rotor and the turbine diaphragm;
   an axial spring plunger connected to the housing;
   a radial spring plunger connected to the housing and orthogonal to the axial spring plunger; and a sliding or rolling surface on a side of the housing opposite from one of the axial spring plunger and the radial spring plunger, wherein the housing is sized to fit in an L-shaped groove formed in the turbine diaphragm, and wherein the housing comprises an axial step section protruding axially from the housing and extends substantially to a floor of the groove such that the housing is shaped corresponding to the L-shaped groove in the turbine diaphragm.

2. A tool according to claim 1, wherein the two circumferential elements include the turbine rotor as an inner circumferential element and the turbine diaphragm as an outer circumferential element, and wherein the axial spring plunger and the radial spring plunger are positioned relative to the housing for engagement with the inner circumferential element.

3. A tool according to claim 2, wherein the sliding or rolling surface is positioned relative to the housing for engagement with the outer circumferential element.

4. A tool according to claim 1, further comprising a bottom position indicator connected to the housing.

5. A tool according to claim 4, wherein the bottom position indicator comprises two tape measures, one each attached to opposite longitudinal ends of the housing.

6. A tool according to claim 4, wherein the bottom position indicator comprises two ropes, one each attached to opposite longitudinal ends of the housing, the ropes including color-coded markings.

7. A tool according to claim 6, wherein the color-coded markings are positioned according to a turbine stage to which the tool is applied.

8. A tool according to claim 1, wherein the housing comprises a cut-out for accommodating a sensor cable.

9. A tool according to claim 1, wherein the housing is sized to fit between the turbine rotor and the turbine diaphragm.

10. A tool according to claim 1, wherein the sliding or rolling surface is positioned on a side of the housing opposite from the radial spring plunger.

11. A tool according to claim 1, wherein the housing comprises an opening through which the sensor is inserted, an exterior surface of the sensor being threaded, and wherein the tool further comprises attachment members threaded on the sensor on opposite sides of the opening.

\* \* \* \* \*